Feb. 9, 1943.　　　　J. MÜLLER　　　　2,310,455
ULTRA SHORT WAVE AMPLIFIER CIRCUIT
Filed April 15, 1941
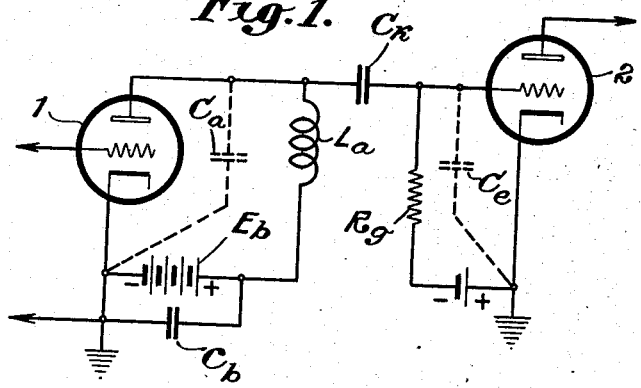
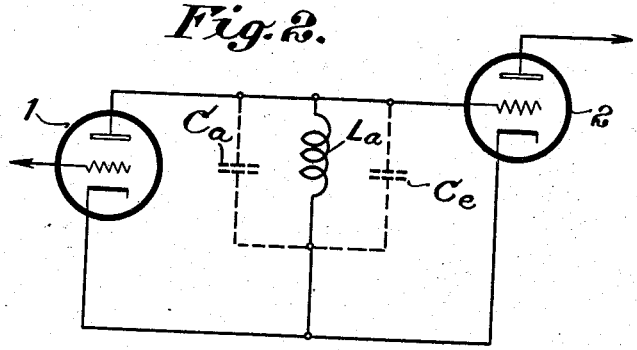
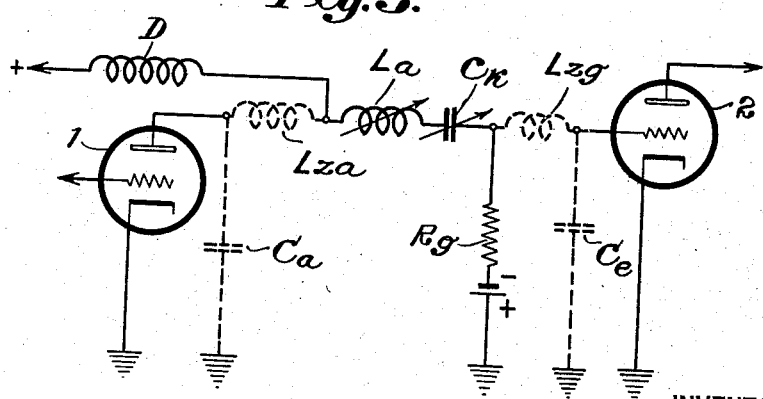
INVENTOR
Johannes Müller
BY H. S. Brover
ATTORNEY Patented Feb. 9, 1943

2,310,455

UNITED STATES PATENT OFFICE 2,310,455

ULTRA SHORT WAVE AMPLIFIER CIRCUIT

Johannes Müller, Berlin, Germany; vested in the Alien Property Custodian

Application April 15, 1941, Serial No. 388,579
In Germany October 13, 1939

4 Claims. (Cl. 179—171)

The present invention relates to a circuit for amplifying ultra-short waves.

In the drawing, Fig. 1 illustrates a known circuit arrangement; Fig. 2 shows only the essential circuit elements of Fig. 1 necessary for an understanding of an explanation given hereinafter; and Fig. 3 illustrates one embodiment of the invention.

In the customary amplifier circuits the plate circuit of a tube contains a resonant circuit tuned to the oscillation to be amplified, or a possibly high impedance with which the input circuit of a following tube is coupled. The customary arrangement is shown in Fig. 1. The anode of the tube 1 is connected to the plus pole of the plate voltage source $E_B$ across the anode circuit coil $L_a$ and the said voltage source is suitably bridged by a condenser $C_b$ unless the natural capacity of the voltage source forms a sufficient short circuit for the frequency to be amplified. The control grid of the following tube 2 is connected through a coupling condenser $C_k$ with the anode of the preceding tube, or with a point of the plate circuit impedance $L_a$. The control grid of the tube 2 is impressed with a biasing potential across a high-ohmic resistance $R_g$. In considering the behavior of the circuit at operation it is to be borne in mind that the anode-cathode path of the tube 1 has shunted thereto the so-called output capacity $C_a$ formed by the inherent capacities of the electrodes and the leadins thereof. Moreover, the so-called input capacity $C_e$ of the tube acts in parallel to the grid-cathode path of the tube 2. In order to get a clearer view as regards the influence of the input capacity and output capacity, the circuit diagram according to Fig. 2 is simplified inasmuch as only those circuit elements are shown which enter into the alternating current circuit. It is seen that the inherent capacities $C_a$ and $C_e$ are placed in parallel to the plate impedance $L_a$ and form with the latter a fly wheel circuit (i. e., tuned circuit). Since, in practice, each of the two capacities is equal to about $3\mu\mu F$, the plate impedance $L_a$ has shunted thereto a capacity of about $6\mu\mu F$, thus determining the shortest wavelength and the resonance resistance of the plate circuit.

The present invention affords a further shortening of the lower limit wavelength and furthermore an improvement in the resonance properties of the plate circuit.

In accordance with the present invention the plate circuit impedance $L_a$ is inserted into the connection between the anode of the preceding tube and the control grid of the following tube so that it forms a fly wheel circuit, in combination with a capacity formed by the series connection of the output capacity of the preceding tube and the input capacity of the following tube. It can be readily seen that when assuming approximately equal values for the input capacity and output capacity of the tubes joining both sides, the capacity in parallel to the impedance of the plate circuit is substantially decreased compared to the known circuits, whereby there is obtained a shorter natural wave of the plate circuit.

Further explanation of the invention will now be given by reference to Fig. 3, representing a form of construction according to the present invention. The anode of the tube 1 is connected through the plate circuit coil $L_a$ to the control grid of the tube 2. The inductance $L_a$ has placed in series thereto the inherent inductance $L_{za}$ of the anode lead-in of the tube 1 and the inherent inductance $L_{zg}$ of the control grid lead-in of the tube 2. These three inductances have in parallel thereto a series connection of the inherent output capacity $C_a$ and the inherent input capacity $C_e$. When assuming again for $C_a$ and for $C_e$ each the value $3\mu\mu F$, the capacity placed in parallel to the inductances is only $1.5\mu\mu F$. Eventually, the lead-in inductances $L_{za}$ and $L_{zg}$ may be sufficient already as plate circuit inductance so that it is not necessary at all to insert a plate circuit coil $L_a$. In order to isolate the control grid of the tube 2 from the anode of the tube 1 from a direct current standpoint, the coupling condenser $C_k$ is employed whose capacity is generally chosen so high that it represents a negligibly low resistance to the frequency to be amplified. The direct plate potential for the tube 1 is applied across a choke D, while the control grid of the tube 2 receives its biasing potential again across a high-ohmic resistance $R_g$.

The possibility exists of also utilizing the coupling condenser $C_k$ for the tuning of the plate circuit and to choose its capacity sufficiently small so that its reactance neutralizes a portion of the reactance of the plate circuit inductance $L_a$. In this case $C_k$ is adapted suitably as a variable condenser. The wattless resistance of this condenser is no longer low as compared with the wattless resistance of the plate circuit inductance, a condition which differs from the usual block condensers. The tuning can further be carried out by varying $L_a$.

The circuit shown in Fig. 3 could be objected to on the ground that between the control grid and the anode of the tube 2 there appears only a part of the resonance potential of the plate circuit and which is determined by the voltage divider ratio of the capacities $C_a$ and $C_c$. However, this does in no way denote that as compared with the circuit shown in Fig. 1 the above circuit acts in a poorer way during the operation. It is next to be borne in mind that the looser coupling of the tube 2 with the resonant circuit entails a reduction of the damping carried from the grid-cathode path of the tube 2 to the resonant circuit. As is known, the grid-cathode path represents, at operation with ultra short waves, no infinitely high resistance to conductivity even where the control grid has continuously a negative potential with respect to the cathode; this phenomenon has to do with travel time effects. In the circuit according to the present invention this damping can have no such damaging effect upon the resonance resistance of the plate circuit as is the case in Fig. 1 so that the resonance potentials produced in the said resistance will be higher. Furthermore, it is to be borne in mind that in the circuit according to the present invention the lead-in inductances $L_{za}$ and $L_{zg}$ are included in the inductance of the oscillation circuit, while in the case of Fig. 1 they jeopardize the coupling of the plate circuit with the discharge paths, or act as choke.

What is claimed is:

1. An ultra short wave amplifier circuit comprising first and second electron discharge device stages, each stage having a cathode, an anode and a control electrode; a connection between said cathodes; and a tuned circuit having a single degree of freedom consisting solely of an inductive branch connected between the anode of said first stage and the control electrode of said second stage and a pair of series arranged capacities shunting said inductive branch, said capacities being solely the inherent capacities between the electrodes of said stages and the leads thereto; a connection from that terminal of the inductive branch which is adjacent the anode of the first stage to the positive terminal of a source of anode potential, said last connection having in series therewith a choke acting as an inductance at very high frequencies.

2. An ultra short wave amplifier circuit comprising first and second electron discharge device stages, each stage having a cathode, an anode, and a control electrode; a connection between said cathodes; and a tuned circuit having a single degree of freedom consisting solely of a branch connected between the anode of said first stage and the control electrode of the second stage and a pair of series arranged capacities shunting said branch at the terminals thereof, said capacities being solely the inherent capacities between the electrodes of said stages and the leads thereto, said branch including inductance, and means for supplying polarizing potential to the anode of said first stage comprising a connection to a point of low radio frequency potential on said tuned circuit.

3. An ultra short wave amplifier circuit comprising first and second electron discharge device stages, each stage having a cathode, an anode, and a control electrode; a connection between said cathodes; and a tuned circuit having a single degree of freedom consisting solely of a branch connected between the anode of said first stage and the control electrode of the second stage and a pair of series arranged capacities shunting said branch at the terminals thereof, said capacities being solely the inherent capacities between the electrodes of said stages and the leads thereto, said branch including inductance and a condenser in series therewith, and a bias circuit for the control electrode of said second stage connected to a point of relatively low radio frequency potential on said tuned circuit.

4. A single degree of freedom circuit for coupling a first tube having anode to cathode interelectrode capacity to a second tube having grid to cathode interelectrode capacity, comprising an inductive path connected between the anode of the first tube and the grid of the second tube, a blocking condenser in said path, the reactance of said path at the operating frequency being equal to the sum of the reactances of said two interelectrode capacities, a direct current choke feed circuit connected to said path at a point of low radio frequency potential located between said blocking condenser and said anode, whereby the admittance of said choke feed circuit has a negligible effect on the natural frequency of said single degree of freedom circuit, and an energizing path for the grid of said second tube connected to said inductive path at a point between said blocking condenser and said grid, the impedances and point of connection of said energizing path for said grid being so chosen that said energizing path also has negligible effect on the resonant properties of said single degree of freedom circuit.

JOHANNES MÜLLER.